Figure 1:
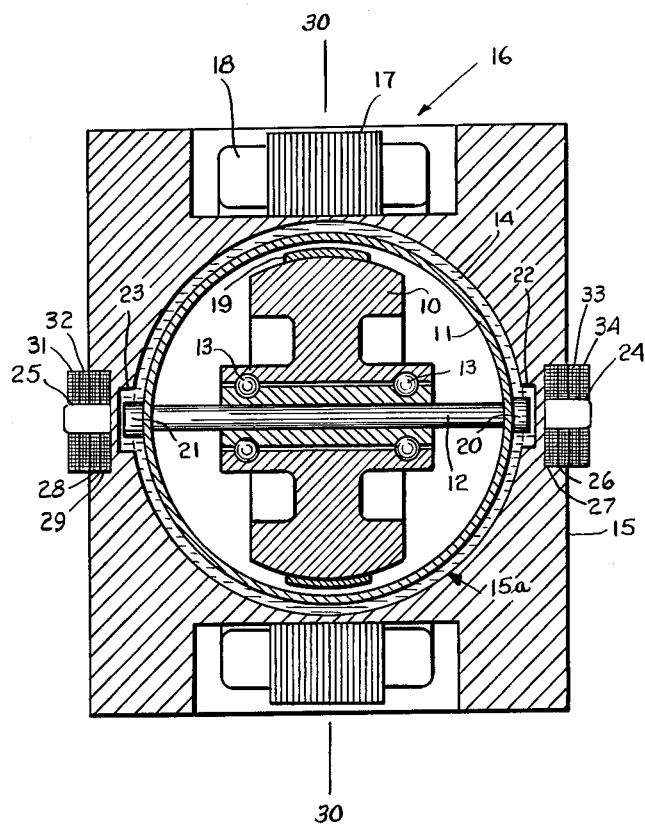

INVENTOR.
MARVIN TAYLOR

United States Patent Office 3,262,324
Patented July 26, 1966

3,262,324
ROTATING FLOAT GYROSCOPE
Marvin Taylor, Bethpage, N.Y., assignor to American Bosch Arma Corporation, a corporation of New York
Filed May 3, 1961, Ser. No. 107,350
9 Claims. (Cl. 74—5)

The present invention relates to gyroscopic devices and has particular reference to fluid suspended sensitive elements.

Recent gyroscopic art has turned to liquid or fluid flotation of submerged gyroscopic sensitive elements to reduce the friction acting on the pivots of the gimbal system of the gyroscopic element. Fundamental performance and manufacturing problems have remained, however, with regard to mechanical systems for centering the submerged gyroscopic element, and methods for conducting electrical spin motor power into the submerged gyroscopic element. Rotating fluid gyros have been described in the past as means for circumventing the above remaining problems. The rotating float gyro which is now proposed bears little resemblance to these previous devices.

In the past, an inner inertia mass, usually embodied in a spherical body, is forced into rotation by fluid coupling acting between a fluid container which is rotated at high speed and the spherical body which is submerged in the fluid. The rotating inner inertia mass possesses gyroscopic tendencies, but the presence of appreciable fluid coupling between the inner inertia mass and the fluid container has prevented development of gyroscopic instruments of this type into successful devices.

In the present invention, the inner inertia mass rotates within a spherical float casing, which is submerged in a fluid contained in a stationary housing. The mass is driven by electrical windings on the exterior of the housing, and the spin bearing friction and windage between the inertia mass and the float casing cause the float to rotate slowly in the fluid. This slow rotation of the float centers it by the "wedging action" of the fluid, but the relatively slow speed of the fluid does not create appreciable fluid coupling, which wound hinder the freedom of the inertia mass with respect to the housing.

In this case, the rotating inertia mass creates float rotation which centers the float, while in the former devices, the rotating fluid provided the torque for rotating the inertia mass.

In the preferred embodiment of the present invention, a gyroscopic rotor is mounted for rotation in a fluid-tight float casing, and the float casing is submerged in a fluid contained in a housing. The rotor is driven by electrical motor windings which are mounted externally to the housing. The float is, therefore, completely free in the fluid, there being no mechanical centering or gimbal structure between the float and the housing, nor any electrical leads feeding power to the gyroscopic rotor inside the float. As the rotor is driven, the windage and friction torques drag the float around with it at a speed dependent upon the viscosity of the suspending fluid.

The rotation of the float has a centering effect whereby rotation of the float takes place about an axis at the center of the housing. The fluid mechanism which provides radial centering of the float also acts to provide axial centering.

A gyroscopic instrument constructed according to the principles of the present invention will have numerous advantages. It will be relatively easy to fabricate and assemble due to the absence of mechanical or electrical connections between the float and the housing. Fluid stability is improved by the fluid rotation, which rapidly provides uniform temperature and reduces the effect of hot spots. Float rotation reduces the effect of radial unbalances in the same manner as case rotation in conventional gyroscopes. Other advantages will become clear in the detailed description to follow.

For a more complete understanding of the invention, reference may be had to the accompanying diagrams in which FIGURE 1 is a cross sectional view of the gyroscope.

With respect to FIGURE 1 of the drawings, the preferred embodiment of the invention includes a gyroscope wheel 10 mounted in a substantially spherical gyro float casing 11 on a shaft 12 for rotation about the axis of shaft 12 with respect to the float casing 11. The shaft 12 may be integral with either the float casing 11, in which case bearings 13 are provided between the wheel 10 and the shaft 12 as shown, or the shaft may be integral with the wheel 10, in which case the shaft 12 would be journalled in bearings (not shown) carried by the float casing 11. In either case, the bearing can be ball bearings, gas bearing, or any other suitable type permitting high speed rotation of wheel 10 within float casing 11.

The float casing 11 is suspended in substantial neutral floatation in a fluid 14 which fills the space between the substantially spherical cavity in the housing 15 and the float casing 11. The fluid 14 can be any of the standard types now being used in the art or any other fluids such as liquid metals. The stator structure 16 of a motor is carried externally of the cavity 15a and includes magnetic frame 17 with electrical windings 18 thereon.

The periphery of wheel 10 is provided with a steel ring 19 which forms the rotor of a hysteresis motor of which the stator structure 16 is the stator. Appropriate energizing of windings 18 therefore causes rotation of wheel 10 in accordance with the theory of electrical motors. The hysteresis synchronous motor drive is the preferred method of rotation, but induction motor action can be employed, if desired, by properly constructing the rotor 10.

The friction at bearings 13 and the windage between the wheel 10 and float casing 11 will exert torques on the float casing 11 as the wheel 10 is spun, thereby causing the casing to follow the wheel 10 at a slow speed, the speed being determined by the viscous drag on casing 11 exerted by fluid 14.

The rotation of the submerged float casing 11 creates a centering action which forces the float casing 11 (and with it the wheel 10) to rotate about an axis substantially coincident with a diameter of the spherical cavity 15a.

The radial and axial centering action is provided by components of the well known fluid wedging action caused by the rotating float.

Float casing 11 is preferably provided with a pair of stub shafts 20, 21, extending outward of the float casing 11 in line with shaft 12. The stub shafts 20, 21 fit loosely into cylindrical recesses 22, 23, respectively, formed in the housing 15. The stub shafts 20, 21 limit the displacement of the float casing 11 with respect to the housing 15 so as to maintain the rotor 10 in approximately the position it will attain when in rotation. The shafts 20, 21 may also be employed in the pickoff arrangement for detecting angular displacement between the spin axis of gyro wheel 10 and the housing 15. In one arrangement, an electromagnet 24, 25 is placed externally of housing 15 opposite the respective shafts 20, 21. Pickoff coils 26, 27 surround the magnet 24 and coils 28, 29 surround magnet 25. Angular displacement of the axis of shaft 12 about a vertical axis 30—30 will displace the stub shafts 20, 21 from the center of magnets 24, 25 and produce a proportional output signal across the series connected windings 26, 28. Similarly, angular displacement about a horizontal axis (perpendicular to the plane of the paper) will produce an output signal across windings 27, 29. The windings 26 and 28 and windings 27, 29 will not be responsive to translational displacement as is well known in the art.

Also torquing windings 31, 32, 33 and 34 may be provided on the casing 15, the field of which would react with permanently magnetized stub shafts 20, 21.

It should be understood that the pickoff and torquing arrangements just described are merely illustrative and any other suitable pickoff or torquer schemes can be used in their place, if desired.

The operation of this gyroscope will be readily understood from the prior description; the rotation of the rotor 10 drags the float casing 11 around with it in the fluid 14. The rotation of the float casing 11 provides centering of the float in the housing 15. The housing 15 may be mounted in an external gimbal structure to permit use of the gyroscope as a compass, stable element, directional gyroscope or in any other device using a free gyro of limited movement for the sensitive element. The pickoff arrangement 24–29 between the float and the housing will be used to energize follow-up motors (not shown) which keep the housing aligned with the gyro spin axis to limit the angular displacement between the casing and the housing.

The torque produced by the magnetic field of the stator 16 in the event of angular displacement between the plane of stator 16 and the plane of the wheel 10 is minimized by proper shaping of both the stator lamination 17 and the outer surface of hysteresis ring 19. By proper design wherein the ring 19 is much narrower than the face of the stator 17, this effect can be reduced to substantially zero over the small angular displacement permitted.

Also, the effect of the viscous drag of fluid 14 on the float casing 11 in the event of angular motion of the housing 15 with respect to the casing 11 about an axis perpendicular to the spin axis is made small by proper choice of fluid 14, the fluid gap between float casing 11 and housing 15, and the exterior finish of float casing 11 and should not produce any substantial precessional errors. Thus, the float casing 11 is suspended in essentially complete freedom in housing 15 and relative angular displacements between the housing 15 and the float casing 11 should not apply any substantial error producing torques to the float casing 11.

Recapitulating, it will be seen that there is no need to provide any electrical connections to the interior of the housing 15. There are no mechanical constraints between the float casing 11 and the housing 15 such as that inherent in an intermediate gimbal ring placed between the float casing 11 and housing 15. The absence of both the electrical connection and the mechanical gimbal construction from the interior of housing 15 result in an extremely simple manufacturing assembly. The rotation of the float casing acts to distribute any radial weight unbalances to the end that their error producing effects are minimized in the same manner as accomplished by case rotation in a conventional gyroscope.

I claim:

1. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, and electrical windings on said housing adapted to create a magnetic field for driving said wheel about said axis, said casing being interposed between said wheel and said housing whereby rotation of said wheel in said casing results in rotation of said casing in said fluid and hydro-dynamic centering of said casing in said housing.

2. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, means for driving said wheel about said axis, said casing being interposed between said wheel and said housing whereby rotation of said wheel in said casing results in rotation of said casing in said fluid about said axis and hydro-dynamic centering of said casing in said housing and means for detecting the angular displacement of said casing from said housing about at least one axis perpendicular to said axis of rotation of said wheel.

3. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, means for driving said wheel about said axis, said casing being interposed between said wheel and said housing whereby rotation of said wheel in said casing results in rotation of said casing in said fluid about said axis and hydro-dynamic centering of said casing in said housing and means on said housing and casing for applying a torque to said casing about at least one axis perpendicular to said axis of rotation of said wheel.

4. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, means for driving said wheel about said axis, said casing being interposed between said wheel and said housing whereby rotation of said wheel in said casing results in rotation of said casing in said fluid about said axis and hydro-dynamic centering of said casing in said housing, means for detecting the angular displacement of said casing from said housing about at least on axis perpendicular to said axis of rotation of said wheel, and means on said housing and casing for applying a torque to said casing about at least one axis perpendicular to said axis of rotation of said wheel.

5. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, electrical windings on said housing adapted to create a magnetic field for driving said wheel about said axis, said casing being interposed between said wheel and said housing whereby rotation of said wheel in said casing results in rotation of said casing in said fluid and hydro-dynamic centering of said casing in said housing and means for detecting the angular displacement of said casing from said housing about at least one axis perpendicular to said axis of rotation of said wheel.

6. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, electrical windings on said housing adapted to create a magnetic field for driving said wheel about said axis, said casing being interposed between said wheel and said housing whereby rotation of said wheel in said casing results in rotation of said casing in said fluid and hydro-dynamic centering of said casing in said housing and means on said housing and casing for applying a torque to said casing about at least one axis perpendicular to said axis of rotation of said wheel.

7. In a gyroscopic apparatus, a housing having a substantially spherical cavity therein, a substantially spherical sealed casing in said cavity, a gyroscopic wheel, said wheel being mounted in said casing for rotation about an axis fixed to said casing, a fluid in said cavity submerging said casing and suspending said casing in substantial neutral floatation therein, electrical windings on said housing adapted to create a magnetic field for driving said wheel about said axis, said casing being interposed between said wheel and said housing whereby rotation of said wheel in said casing results in rotation of said casing in said fluid and hydro-dynamic centering of said casing in said housing, means for detecting the angular displacement of said casing from said housing about at least one axis perpendicular to said axis of rotation of said wheel, and means on said housing and casing for applying a torque to said casing about at least one axis perpendicular to said axis of rotation of said wheel.

8. In gyroscopic apparatus: a housing having a cavity therein; a sealed casing in said cavity; a fluid in said cavity between said housing and said casing suspending said casing in substantial neutral floatation in said cavity, so it is free to rotate in said cavity, said housing, said fluid and said cavity being such as to provide hydrodynamic centering of said casing in said cavity upon rotataion of said casing with respect to said housing; a gyro mass mounted in said casing for rotation about an axis through, and fixed with respect to, said casing; and means for driving said gyro mass about said axis; said gyro mass being coupled to said casing sufficiently to produce rotation of said casing, in response to rotation of said gyro mass, at a rate slow compared with the rate of rotation of said gyro mass, thereby to produce hydrodynamic centering of said casing and said gyro mass in said cavity.

9. In gyroscope apparatus, a housing having a substantially spherical cavity therein, a substantially spherical sealed casing in said cavity, a gyroscopic mass in said casing mounted for rotation with respect to said casing and with respect to said housing about an axis lying substantially along a diameter of said cavity, a fluid in said cavity between said housing and said casing submerging said casing and suspending said casing in substantially neutral floatation therein, and magnetic motive means disposed exterior to said casing for driving said mass about said axis sufficiently rapidly to produce rotation of said casing at a rate low compared with that of said mass but high enough for hydro-dynamic centering of said casing in said cavity, said hydrodynamically-centered casing being free to rotate at least to a limited degree about axes normal to said axis.

References Cited by the Examiner
UNITED STATES PATENTS

| | | | |
|---|---|---|---|
| 1,589,039 | 6/1926 | Anschutz-Kaempfe | 74—5.46 X |
| 2,393,473 | 1/1946 | Jones | 74—5.6 |
| 2,785,573 | 3/1957 | Bentley | 74—5 |
| 2,898,765 | 8/1959 | Atkinson et al. | 74—5.7 X |
| 2,960,873 | 11/1960 | Lundberg | 74—5 |

FRED C. MATTERN, JR., *Primary Examiner.*

BROUGHTON G. DURHAM, *Examiner.*

T. W. SHEAR, P. W. SULLIVAN, *Assistant Examiners.*